US006647380B1

(12) United States Patent
Yotsukura

(10) Patent No.: US 6,647,380 B1
(45) Date of Patent: Nov. 11, 2003

(54) PRODUCTION AND INVENTORY CONTROL SYSTEM AND COMPUTER PROGRAM PRODUCT FOR CONTROLLING PRODUCTION AND INVENTORY

(75) Inventor: Mikio Yotsukura, Tokyo (JP)

(73) Assignee: Class Technology Co., Ltd., Tokyo (JP)

( * ) Notice: Subject to any disclaimer, the term of this patent is extended or adjusted under 35 U.S.C. 154(b) by 0 days.

(21) Appl. No.: 09/288,714

(22) Filed: Apr. 9, 1999

(65) Prior Publication Data (65)

(30) Foreign Application Priority Data

Apr. 10, 1998 (JP) .......................................... P10-099570

(51) Int. Cl.[7] ................................................ G06F 7/00
(52) U.S. Cl. .............................. 707/2; 707/3; 707/100; 707/103 R; 707/103 Y; 715/502; 715/513; 715/514; 705/22; 705/28; 705/29
(58) Field of Search ..................... 707/100, 3, 103 R, 707/103 Y, 502, 513, 514, 2; 705/22, 28, 29; 715/502, 513, 514

(56) References Cited

U.S. PATENT DOCUMENTS 5,317,729 A * 5/1994 Mukherjee et al. ............ 707/3
6,052,688 A * 4/2000 Thorsen ...................... 707/100

FOREIGN PATENT DOCUMENTS

| EP | 0 483 039 | 4/1992 |
|----|-----------|--------|
| EP | 0 520 923 | 12/1992 |
| JP | 61-103275 | 5/1986 |
| JP | 07-044612 | 2/1995 |
| JP | 10-040298 | 2/1998 |

OTHER PUBLICATIONS

Peng et al., "A step toward STEP–compatible engineering data management: the data models of product structure and engineering changes" Robotics and Computer Integrated Manufacturing, GB, Elsevier Science Publisher BV., Barking, vol. 14, No. 2, Apr. 1, 1998, pp 89–109 XP004124442.

Taylor et al., "Mead II–An Improved CAD Environmental for Controls Engineering" Proceedings of the American Control Conference, US, New York, IEEE, vol. Conf. 10, 26–28, 1991, pp. 1008–1041, XP000270793.

D. Collins, "Database Meets Programmable Controller (The Shrinking of Level Two)" Proceedings of the Annual Conference of Electrical Engineering Problems in the Rubber and Plastics Industries, US New York, IEEE, vol. CONF. 43, Apr. 15–16, 1991, pp 52–57 XXXP000299127.

* cited by examiner

Primary Examiner—Kim Vu
Assistant Examiner—Hung Pham
(74) Attorney, Agent, or Firm—Foley & Lardner

(57) ABSTRACT

A production and inventory control system, comprises a first business application system for executing a first business application, a second business application system for executing a second business application, and a production database for storing information of the first business application system and the second business application system, wherein the control system distinctively displays the information for each of the first and second business application systems.

23 Claims, 16 Drawing Sheets

FIG.4

| | 111a | | | | 111b | | 111c | 111d | 111e |
|---|---|---|---|---|---|---|---|---|---|
| | P | D | M | S | START | END | SUFFIX | ATTRIBUTES | CONDITIONS |
| A | 1 | 1 | 1 | 1 | 90/01/01 | | | | |
| B1 | 1 | 1 | 1 | 1 | 97/08/30 | 97/08/29 | 1 | | |
| C | 0 | 1 | 1 | 1 | 98/01/01 | | | | |
| D | 1 | 1 | 1 | 1 | 96/01/01 | | | | |
| E | 1 | 1 | 1 | 1 | 96/01/01 | | | | |
| F | 0 | 1 | 1 | 1 | | | | | |
| G | 1 | 1 | 1 | 1 | | | | | |
| H | 1 | 1 | 1 | 1 | | | | | |
| B2 | 0 | 1 | 1 | 1 | 97/08/30 | | 2 | ORDER LIST(0011) DRAWING(1135) TECHNICAL INFORMATION (ha.TXT) | |
| A | 1 | 0 | 0 | 0 | | | | | |
| C | 0 | 1 | 0 | 0 | | | | | |
| C | 0 | 1 | 0 | 0 | | | | | |

SALES MANAGEMENT DIVISION VIEW

| RECEIVING ORDER 001 | — A |
| RECEIVING ORDER 002 | — A |
| RECEIVING ORDER 003 | — A |

| TO: | Q'TY | PRICE | DELIVERY |
|---|---|---|---|
| A COMPANY | 10 | 1000 | 10/1 |
| B COMPANY | 20 | 2000 | 10/15 |
| C COMPANY | 50 | 5000 | N/A |

PRODUCTION AND INVENTORY CONTROL SYSTEM AND COMPUTER PROGRAM PRODUCT FOR CONTROLLING PRODUCTION AND INVENTORY

BACKGROUND OF THE INVENTION

1. Field of the Invention

The present invention relates to a production and inventory control system and computer program for controlling production and inventory.

2. Description of Related Art

FIG. 1 is a block diagram showing a production and inventory control system according to a related art. The system comprises a purchase management system 201, an engineering information system 202, a manufacturing system 203, and a marketing management system 204. Each system has a database system. The purchase management system 201 executes purchase management application programs and registers the results with a purchase division database 211. The system 202 executes engineering information application programs and registers the results with an engineering information division database 211. The same is true for the manufacturing system 203 and the sales management system 204. Each database must be consistent with other databases when these systems are integrated.

Accordingly, the production and inventory control system comprises a maintenance system 220 for consistency of each database. For instance, a system calculates the amount of manufactured articles on that day and determines the amount of next day's base on the calculation results. Also the system controls planned amount on a day or during a period of time. Therefore, the maintenance system 220 executes update programs for each database based on the amount of manufactured articles on that day etc. The update programs are often executed as batch process programs during night, that is, after the work.

If it becomes clear that an increase in the amount of manufactured article is required the next day, some parts of the increasing can be produced on that day, then the increase in production will be reasonably possible. However, it is difficult for a batch process program according to the related art to reduce the delay in lead-time. Therefore, the system cannot follow the information changes, and cannot comply with demands quickly.

SUMMARY OF THE INVENTION

An object of the present invention is to provide a production and inventory control system and computer program product for controlling production and inventory capable of following the information changes, and complying with demands quickly.

In order to accomplish the objects, the present invention provides a production and inventory control system, comprising a first business application system for executing a first business application, a second business application system for executing a second business application, and a production database for storing information of the first business application system and the second business application system, wherein the control system distinctively displaying the information for each of the first and second business application systems.

In this fashion, since the information, which is used by a plurality of application systems, is unified as the production database, the systems can realize following the information changes, and complying with demands quickly. Accordingly, the systems can transit from batch-type production control to real time-type production control. Furthermore, since each system is used at the viewpoint of the each business, the efficiency of business increases. Here, it is not necessary to install all components of the system to a single computer. It may be realized by a plurality of computers using computer technology or network technology.

It is preferred that the production database comprises a parts master for storing display information to determine whether the item is displayed in each system, and a parts structure master for storing structure information of products and/or parts.

It is preferred that the parts master stores address information of drawings or a technical information list corresponding to products and/or parts, and attribute display information to determine whether the drawings or the technical information list is displayed in each system.

It is preferred that the parts structure master stores hierarchical information of the products and/or the parts.

It is preferred that the first business application system provides items based on the display information, and provides drawings or technical information lists corresponding to products and/or parts based on the attribute display information.

It is preferred that the parts master further comprises release information including the start date of an item, and the end date of an item.

It is preferred that the first business application. system has a generation control search engine which outputs the structure of the product or part at a point of date or time based on the release information of parts master.

It is preferred that the parts master further comprises release information including the start date of an item, and the end date of an item, the production database further comprises a version control master for storing version information which specify the structure of a part or product at a point in time.

It is preferred that the first business application has a version control search engine which outputs the structure of the product or part at a point of date or time based on the version information of parts master.

It is preferred that the parts master further comprises condition information for extraction using complex conditions.

It is preferred that the first business application has a complex conditions search engine which outputs the structure of the product or part meeting the complex conditions.

BRIEF DESCRIPTION OF THE DRAWINGS

The objects, features and advantages of the present invention will become more apparent from the following description of a preferred embodiment taken in conjunction with the accompanying drawings, in which:

FIG. 4 shows an example of a parts master 111 in FIG. 3;

FIG. 10 shows an example of display window outputted by sales management system 104 in FIG. 2;

DETAILED DESCRIPTION OF THE EMBODIMENTS

Figure 1:
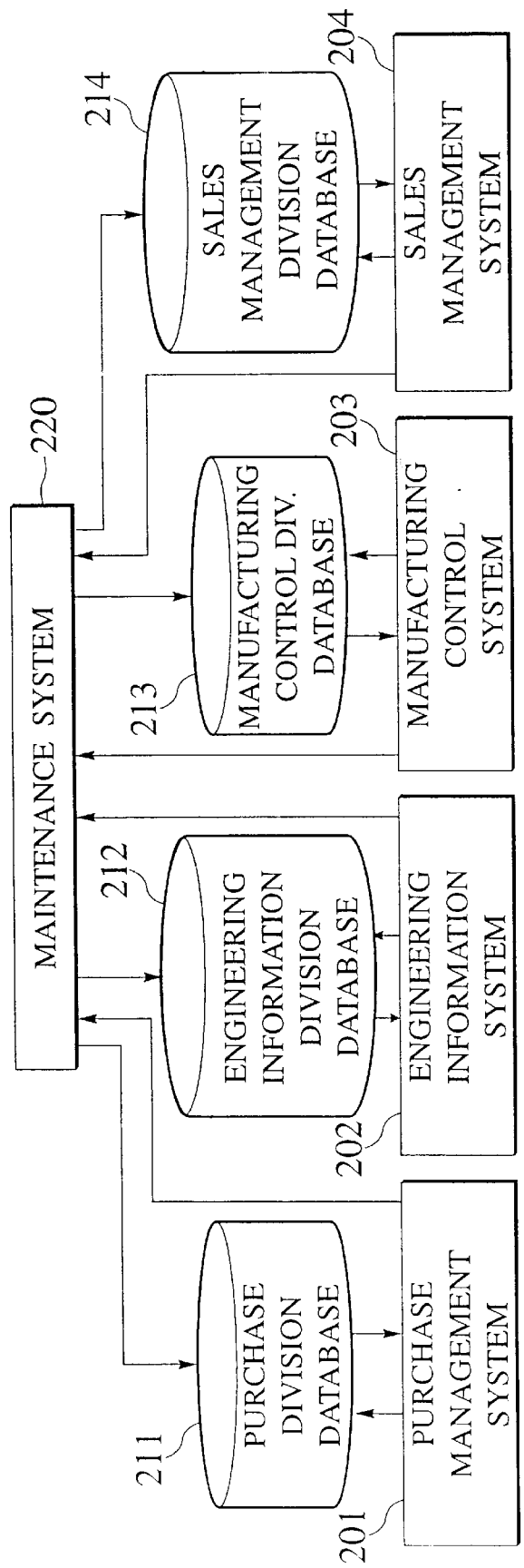
FIG. 1 is a block diagram showing production and inventory control system according to a related art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

To provide the production and inventory control system of the present embodiment, software that realizes the processing as described below is written, and a computer system is used for enabling implementation of the processing. The term 'computer system' may include a main frame computer, workstation, PC, or the like. The hardware configuration of the computer system used in the present embodiment includes a CPU that performs various operations, an input device, such as a keyboard, mouse, light-pen, or a flexible disk device, an output device, such as a display or a printer, and other devices. The CPU includes an operating unit that processes commands associated with the processing of each scheduling unit as explained later, and a main storage unit that stores the commands generated during the processing. The operating unit sequentially reads commands stored in the main memory unit, or external storage device, and executes the commands so as to perform processing for production and inventory control.

Figure 2:
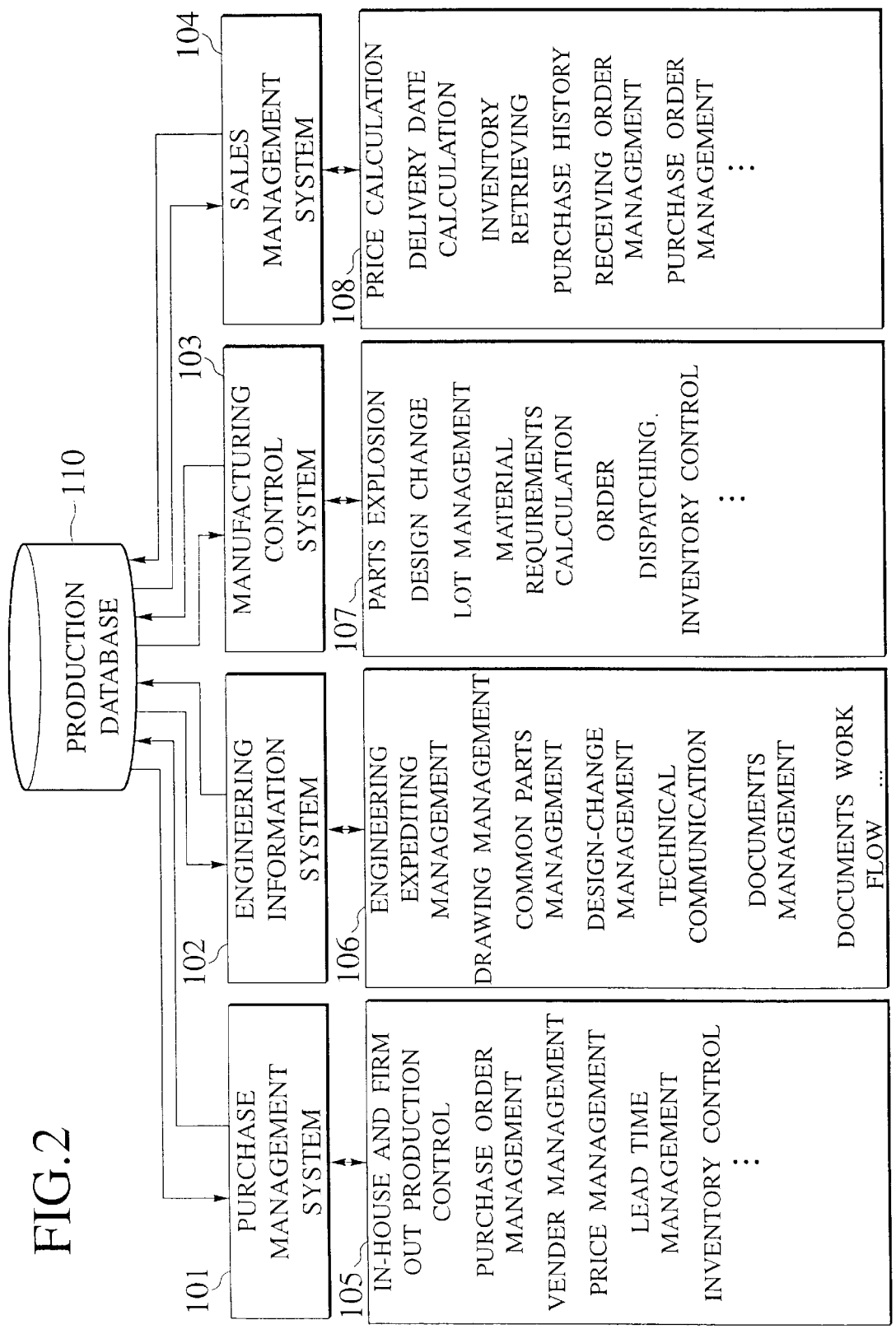
FIG. 2 is a block diagram showing production and inventory control system according to an embodiment of the present invention.

FIG. 2 is a block diagram showing the production and inventory control system according to an embodiment of the present invention. A system according to this invention comprises a plurality of business application systems. In this embodiment, the system comprises a purchase management system 101, an engineering information system 102, a manufacturing control system 103, and a sales management system 104, as an application system of each division.

The purchase management system 101 executes purchase management application 105 as the occasion demands. The purchase management application 105 includes an in-house and firm out production control application for preparing ingredients or materials, purchase order management application for placing an order for ingredients or materials, vendor management application, a price management application for managing a price of ingredients or materials, a lead time management application for managing products' lead time, and inventory control application, and the like.

The engineering information system 102 executes engineering information application 106 as the occasion demands. The engineering information application 106 includes an engineering expediting management application for managing engineering expediting of products and parts, drawings management application for managing drawings of products and parts, common parts management application, a design-change management application, technical communication documents management application for managing technical communication documents recorded communications regarding products or parts, and drawing documents work flow application for managing work flow regarding approval documents.

The manufacturing control system 103 executes a manufacturing control application 107 as the occasion demands. The manufacturing control application 107 includes parts explosion application for disassembling products or parts into its elements, a design change application, a lot management application, material requirements calculation, an order control application, a dispatching application for instructing each manufacturing process, and inventory control application.

The sales management system 104 executes sales a management application 108 as the occasion demands. The manufacturing control application 107 includes a price calculation application for calculating products' price using parts cost etc., a delivery date calculation application for calculating the delivery date based on stock information, an inventory retrieving application, a purchase history application for managing history that customers purchase products, and a purchase order management application.

Next, a production database 110 will be explained as below. The production database 110 is the database for storing information in connection with a plurality of business application systems. Namely, purchase management system 101, engineering information system 102, manufacturing control system 103, and sales management system 104 are provided. Each system mentioned above executes the application, and is registered with the production database 110 based on the execution results.

Figure 3:
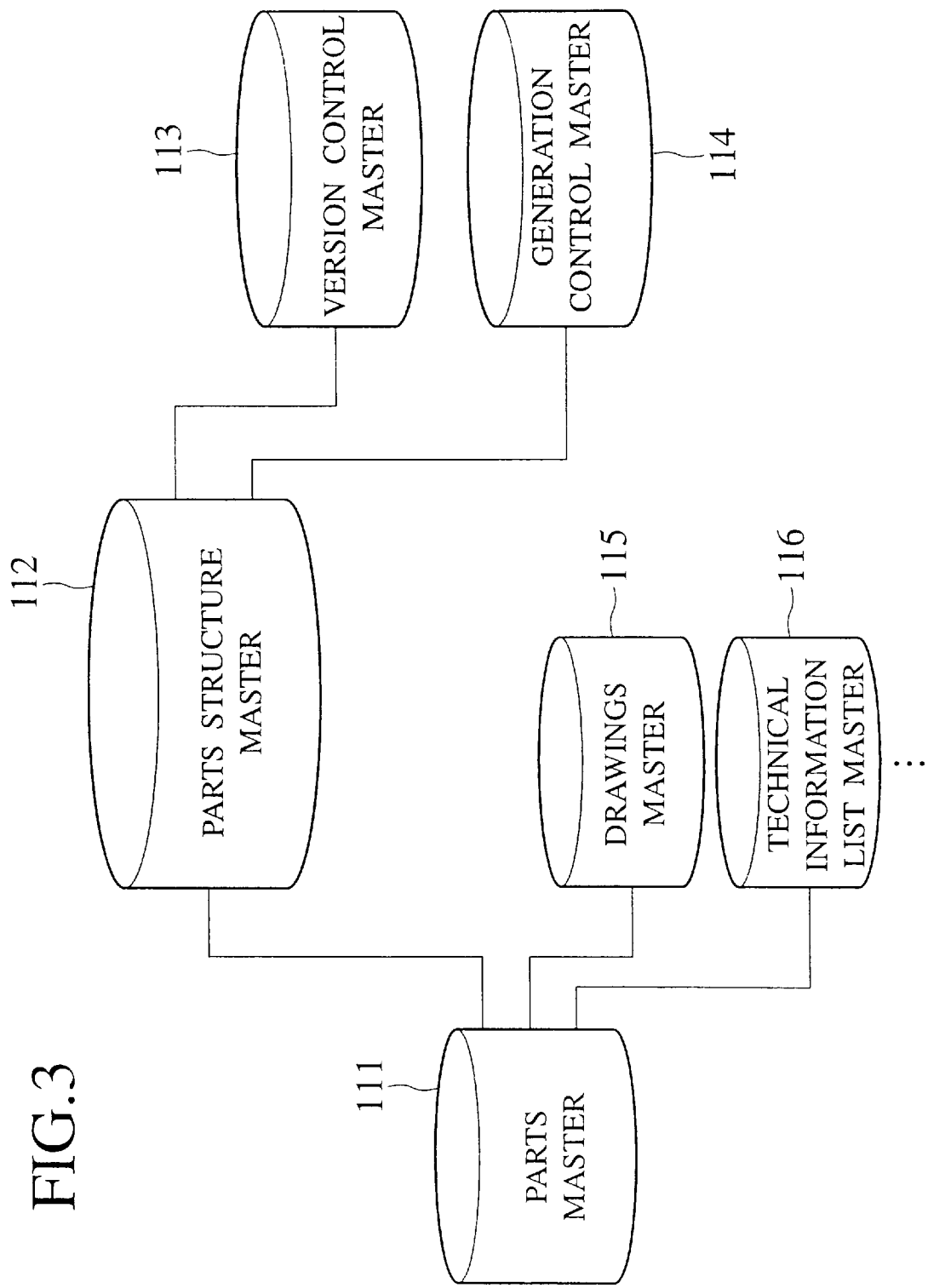
FIG. 3 shows an example of a production database 110 in FIG. 2.

FIG. 3 shows an example of a production database 110 in FIG. 2. The production database 110 has a parts master 111 for storing product and/or part's name, parts structure master 112 for storing the structure information of product and/or parts, a version control master 113 for controlling the version, a generation control master 114 for controlling the generation, drawings master 115 for storing drawings, and a technical information list master 116 for storing the technical information list. The parts master 111 is related to the parts structure master 112, drawings master 115, and technical information list master 116. The parts structure master 112 is related to the version control master 113, and generation controls master 114.

FIG. 4 shows an example of a parts master 111 in FIG. 3. The master 111 stores information about products and parts. In FIG. 4, the master 111 stores an item, display information 111a, release information 111b, suffix information 111c, attribute information 111d, and condition information 111e. The term item is the name of a product or a part. The display information 111a is information to determine whether or not the item is displayed in each system. In this embodiment, "1" represents display, and "0" represents non-display. The release information 111b includes the start date of an item, and the end date of an item. The suffix information 111c is used when the item is changed. The attribute information 111d includes information about drawings of an item, order list, technical information list, and the like. And the condition information is used when complex conditions retrieving is required.

Figure 5:
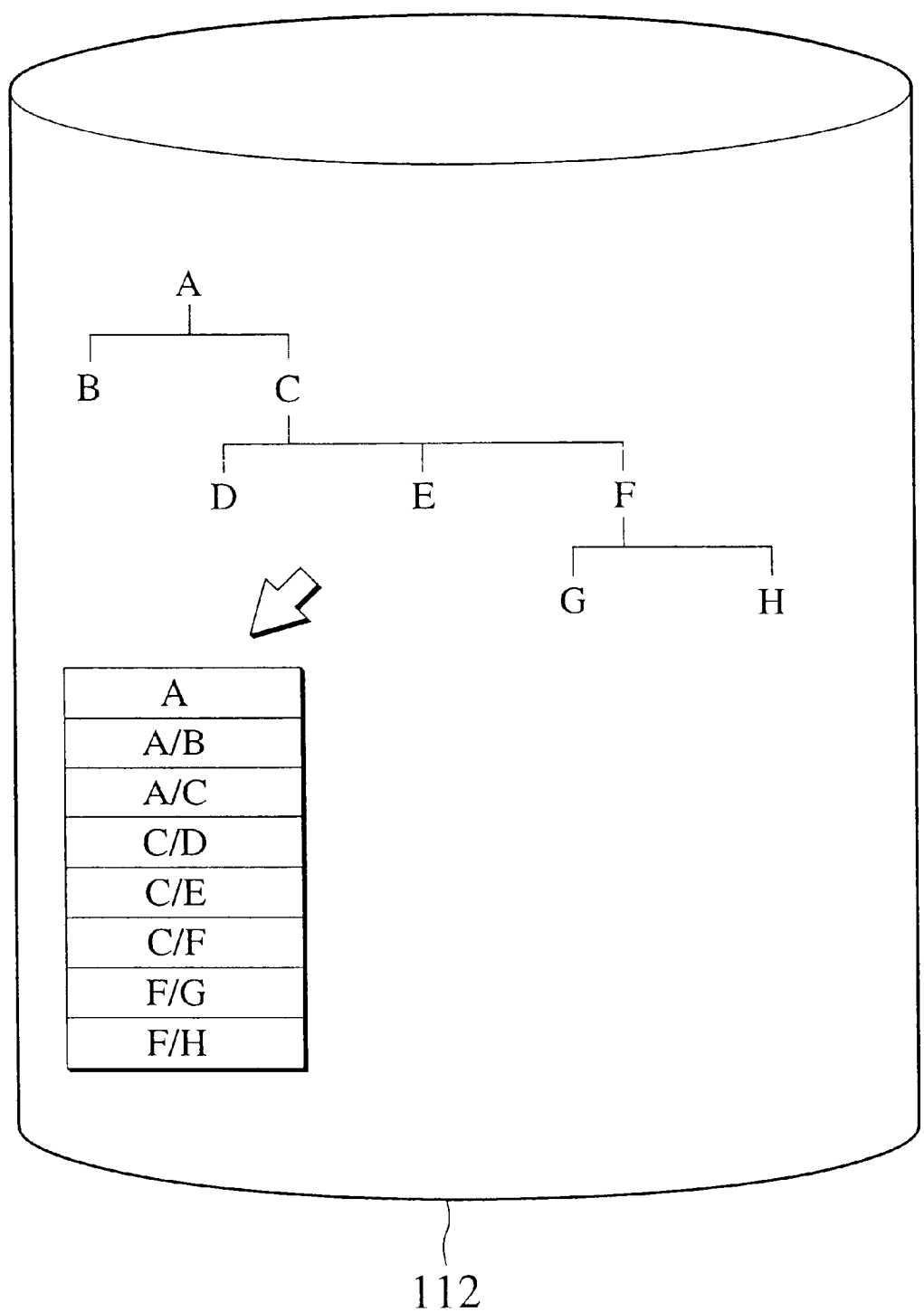
FIG. 5 shows an example of a parts structure master 112 in FIG. 3.

FIG. 5 shows an example of a parts structure master 112 in FIG. 3. The parts structure master 112 stores the hierarchical structure (hierarchical) information of products and/or parts. An example of the part structure information using product A will be explained hereinbelow. In FIG. 5, suppose the product A consists of parts B and C, and the part C consists of parts D, E, and F. Also, suppose the part F consists of parts G and H. In this case, the structure information master stores information about each part's parent, for instance, the part H's parent is the part F. Also, the part F's parent is the part C and the like.

Figure 6:
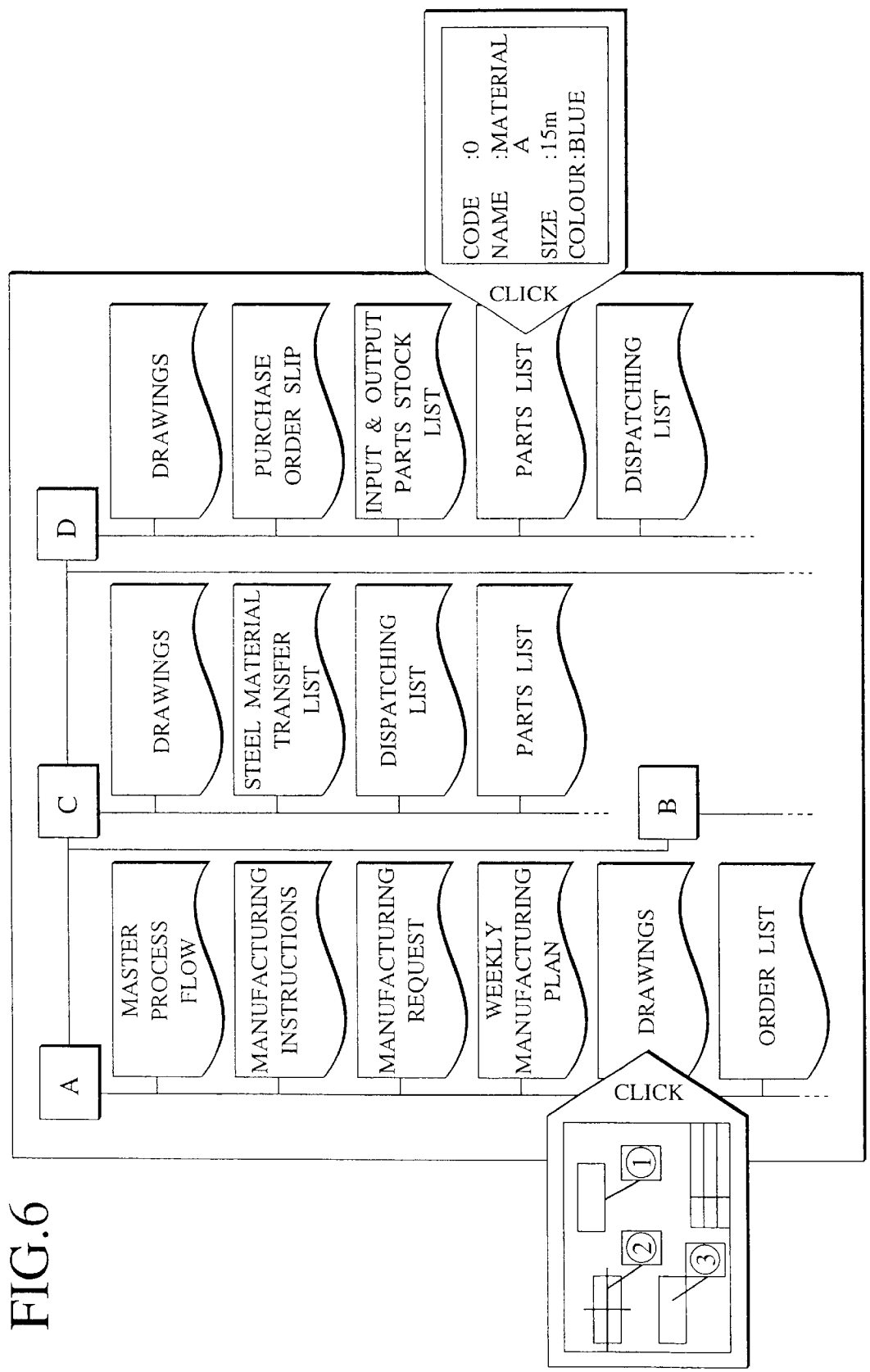
FIG. 6 shows an example of display window.

FIG. 6 shows an example of a display window with GUI (Graphic User Interface). If an operator retrieves information about product A, the system shows product A and parts which are included by product A with a hierarchical (or directory) structure. The operator can get information that product A comprises part B and C. The system shows products' structure based on the parts structure master 112.

The system shows stored information about a product or a part. The information includes information registered at attributes 111d in FIG. 4. The system shows information about product A, for example, a stored master process flow, manufacturing instructions, manufacturing request, weekly manufacturing plan, drawings, and order list. In this way, the system shows information which is registered at attribute column 111d in FIG. 4. Therefore, it is preferred that the information is registered with its address. For example, if drawings are registered, then it is preferred that the address of drawings are also registered.

In FIG. 6, the operator can move a cursor to the displayed information and click it to obtain the information. To display the content is to execute application program for the relevant contents. For instance, to display the drawings, the operator clicks the drawings, and the system executes application program distinguished by filename for the relevant drawings.

Figure 7:
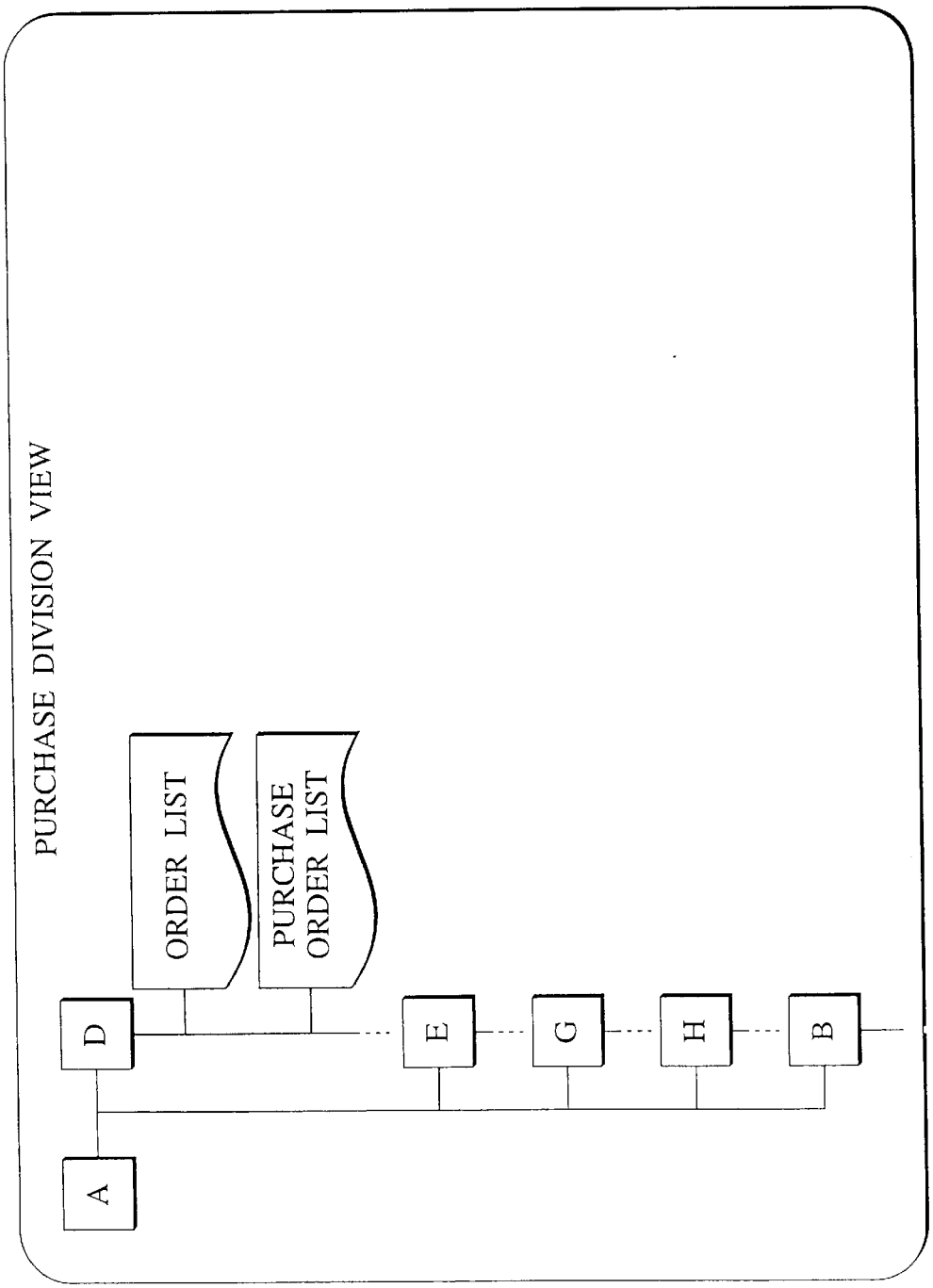
FIG. 7 shows an example of display window outputted by purchase management system 101 in FIG. 2.

FIG. 7 shows an example of a display window outputted by a purchase management system 101 in FIG. 2. This window is used by the purchase management division. The purchase management division performs purchasing of parts or materials. Therefore, the system shall only display the information with regard to purchasing. In other words, it is preferred that the system does not display the information without regard to purchasing.

In FIG. 7, the purchase division view displays product or parts, but not part C, and F, the so-called intermediate. Furthermore, the view does not display a part which is not ordered. The view displays information which is needed for purchasing, for instance, order list, purchase order list, and the like.

In FIG. 7, the operator can move a cursor to the displayed information and click it to obtain the information. To display the content, an application program is executed for the relevant contents. For example, the operator clicks the order list, the system executes the purchase order management application. The operator uses the application to update the information, then the system registers the information with production database 110.

Figure 8:
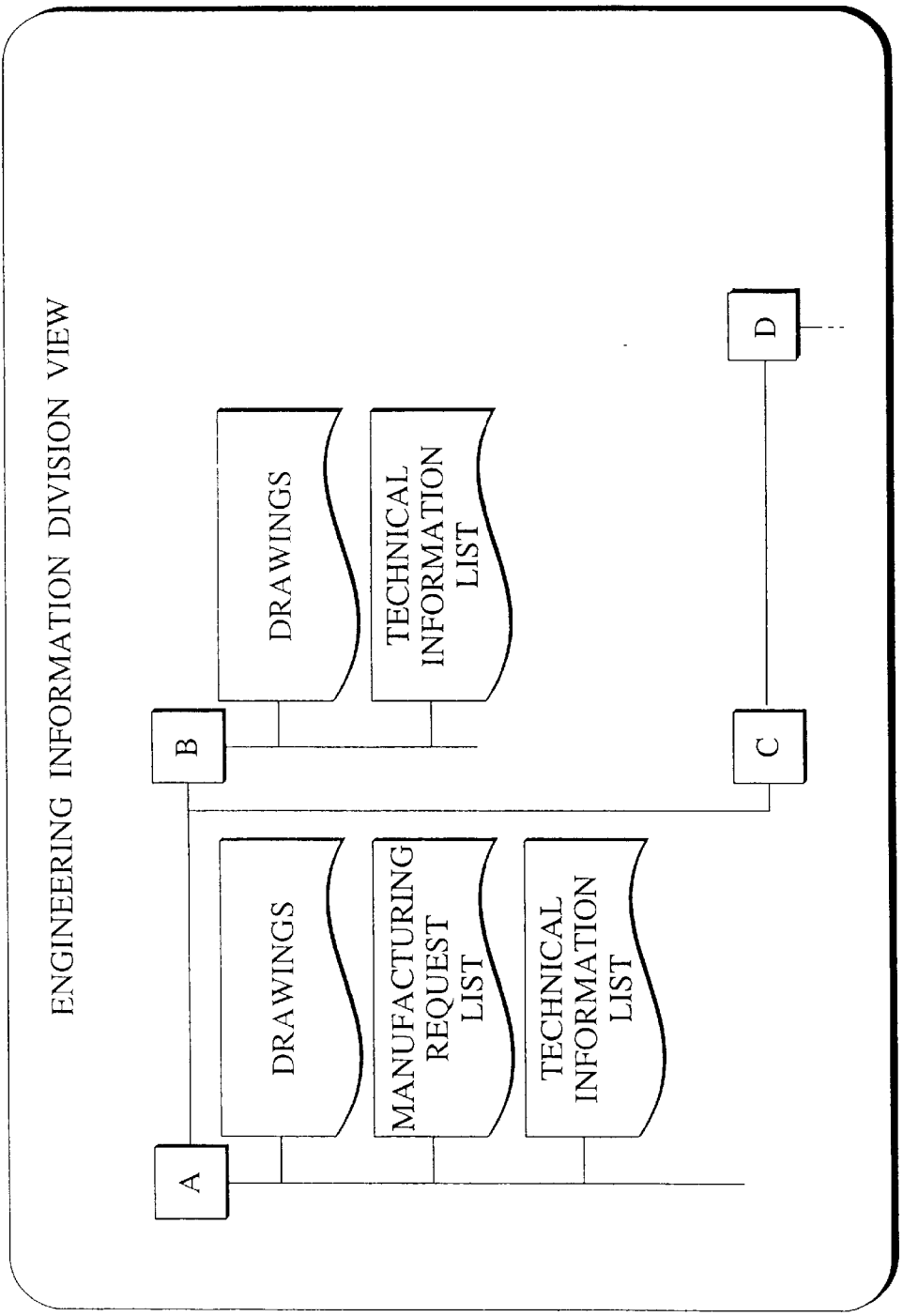
FIG. 8 shows an example of display window outputted by engineering information system 102 in FIG. 2.

FIG. 8 shows an example of a display window outputted by engineering information system 102 in FIG. 2. This window is used by the engineering information division. The engineering information division performs design of products and parts taking into account the manufacturing request and technical information list, and the like. Therefore, the system shall only display the information with regard to engineering. In other words, it is preferred that the system does not display the information without regard to engineering.

In FIG. 8, the engineering division view displays the information which is needed for engineering, for instance, drawings, manufacturing request and technical information list, and the like.

In FIG. 8, the operator can move a cursor to the displayed information and clicks it to obtain the information. To display the content, an application program is executed for the relevant contents. For example, the operator clicks the drawings, the system executes engineering information application. The operator uses the application to update the information, then the system registers the information with production database 110.

Figure 9:
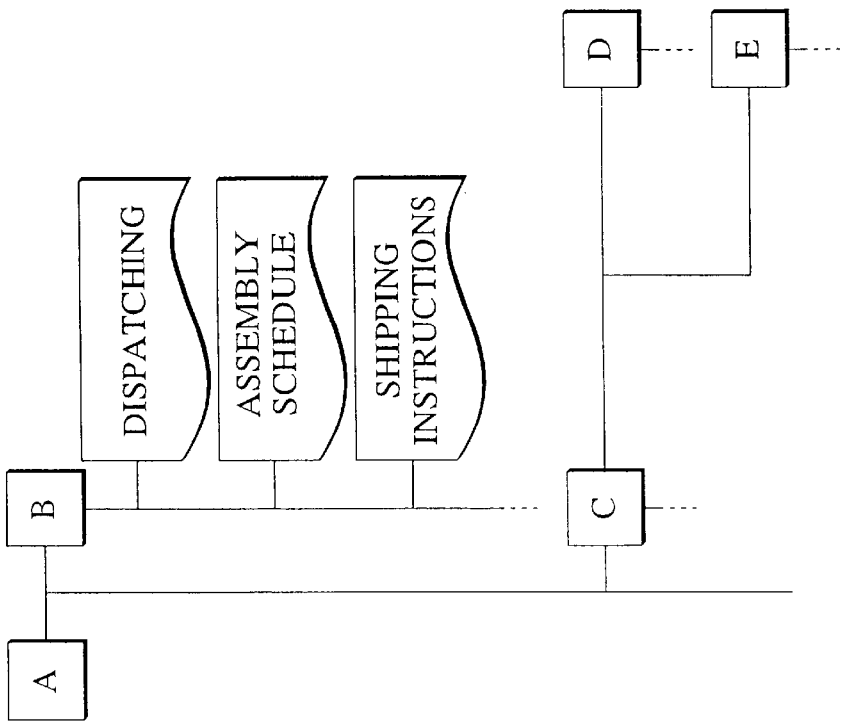
FIG. 9 shows an example of display window outputted by manufacturing control system 103 in FIG. 2.

FIG. 9 shows an example of display window outputted by manufacturing control system 103 in FIG. 2. This window is used by the manufacturing control division. The manufacturing control division performs manufacturing of products and parts taking into account dispatching, assembly schedule, shipping instructions, and the like. Therefore, the system shall only display the information with regard to manufacturing control. In other words, it is preferred that the system does not display the information without regard to manufacturing control.

In FIG. 9, the manufacturing control division view displays the information which is needed for manufacturing control, for instance, dispatching, assembly schedule, shipping instructions, lead time, and the like.

In FIG. 9, the operator can move the cursor to the displayed information and click it to obtain the information. To display the content, an application program is executed for the relevant contents. For example, the operator clicks the dispatching, the system executes dispatching application. The operator uses the application to update the information, then the system registers the information with production database 110.

FIG. 10 shows an example of a display window outputted by sales management system 104 in FIG. 2. This window is used by the sales management division. The sales management division performs selling of products and parts taking into account receiving order, delivery date, and the like. Therefore, the system shall only display the information with regard to sales management. In other words, it is preferred that the system does not display the information without regard to sales management.

In FIG. 10, the sales management division view displays the information which is needed for sales management, for instance, receiving order, ordering company, quantity, price, delivery date, and the like.

In FIG. 10, the operator can move the cursor to the displayed information and click it to obtain the information. To display the content, an application program is executed for the relevant contents. For example, the operator clicks the N/A at delivery, and then the system executes inventory retrieving application. The operator uses the application to update the information, the system registers the information with production database 110.

In this way, the system displays only information, which the operator needs. Since the system manages information integrationally, between purchasing the material of products and selling the products, a series of control system according this embodiment can follow the information changes, and complying with demands quickly.

Figure 11:
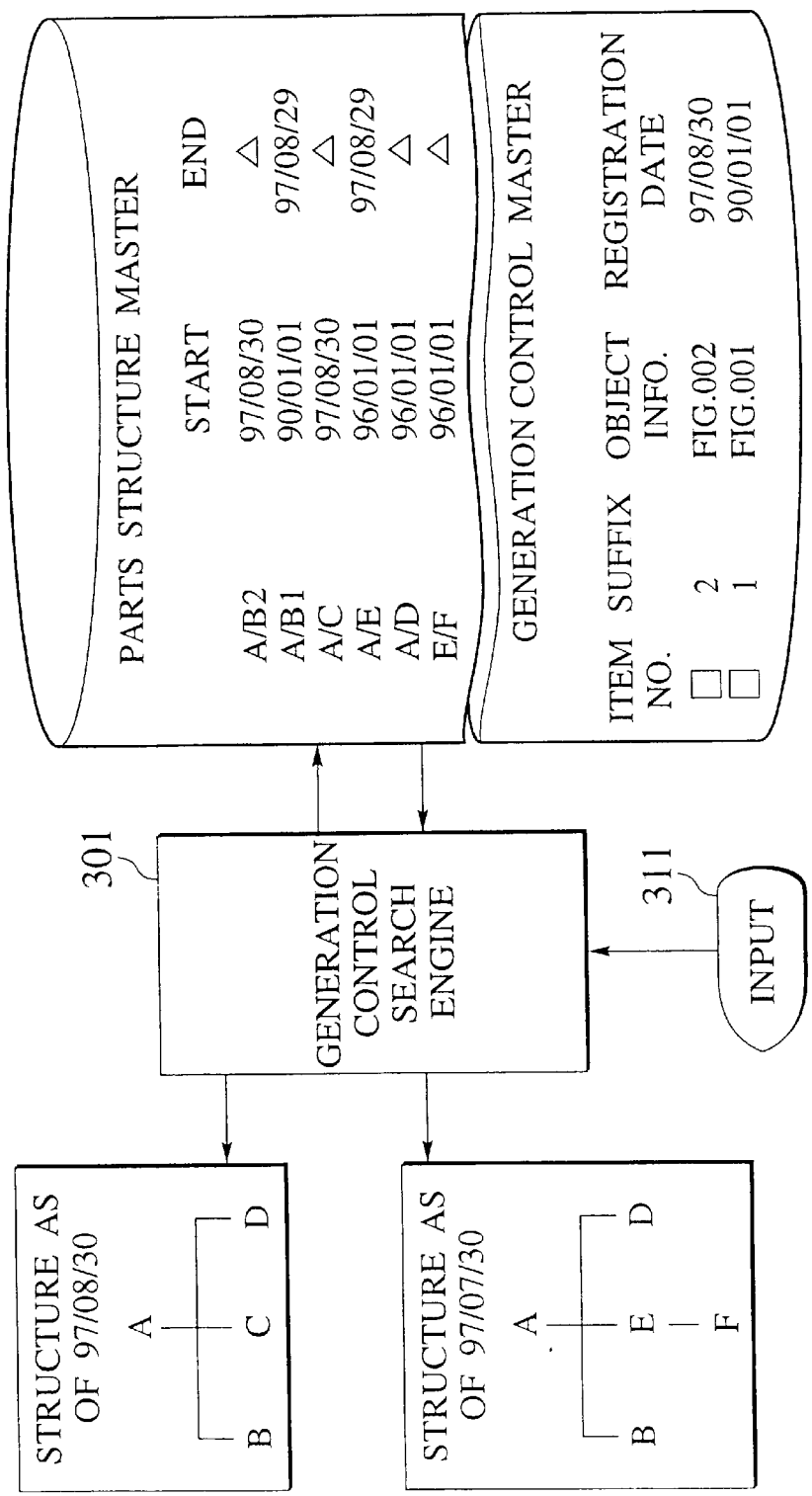
FIG. 11 is a view useful in explaining a generation control in items and parts structure registered with production database 110 in FIG. 2.

FIG. 11 is a view useful in explaining generation control in items and parts structure registered with production database 110 in FIG. 2. For example, the structure of a product must be changed on and after a day. Each division requires the information of the change, that is, the structure at some points. In this case, generation management of each product is required. The generation control will be explained hereinbelow.

In FIG. 11, the operator inputs a condition of the product or part and date or time using input device 311. Then, the generation control search engine 301 receives the condition, and outputs the structure of the product or part at the point of date or time based on release information of production database 110. Suppose an operator inputs a product and date to confirm a product structure as of Aug. 30, 1997. Then, the engine 301 receives the condition and retrieves the part information which the date Aug. 30, 1997 meets the period from "START date" to "END date" of release information of parts structure master in FIG. 11. In this case, part B2, C, and D fulfill the condition. The engine 301 makes a hierarchical structure based on the parts structure master, and displays the structure. Next, suppose an operator inputs a product and date Jul. 30, 1997. Then, the engine 301 receives the condition and retrieves the part information which the date Jul. 30, 1997 include the period from "START date" to "END date" of release information of parts structure master in FIG. 11. In this case, part B1, E, F, and D fulfill the condition. The engine 301 makes the hierarchical structure based on the parts structure master, and displays the structure.

On the other hand, when a part changes its design or specification, the system controls generation by use of a suffix. In such case, the drawing after the change is registered along with the drawing prior to the change with the parts master in FIG. 3. The term suffix is a kind of distinction between prior to the change and after the change. For example, the part B1 is shown in part structure master in FIG. 11. The start date of is Jan. 1, 1990, and end date is Aug. 29, 1997. Thereafter, the B1 was changed B2 as of Aug. 30, 1997. In this case, the suffix is 1 of B1 or 2 of B2.

The generation control master stores object information of each part with the suffix. Suppose there was a design change regarding part B. In this case, the generation control master stores 2 drawings (FIG. 1 and FIG. 2) of B with the suffix.

Figure 12:
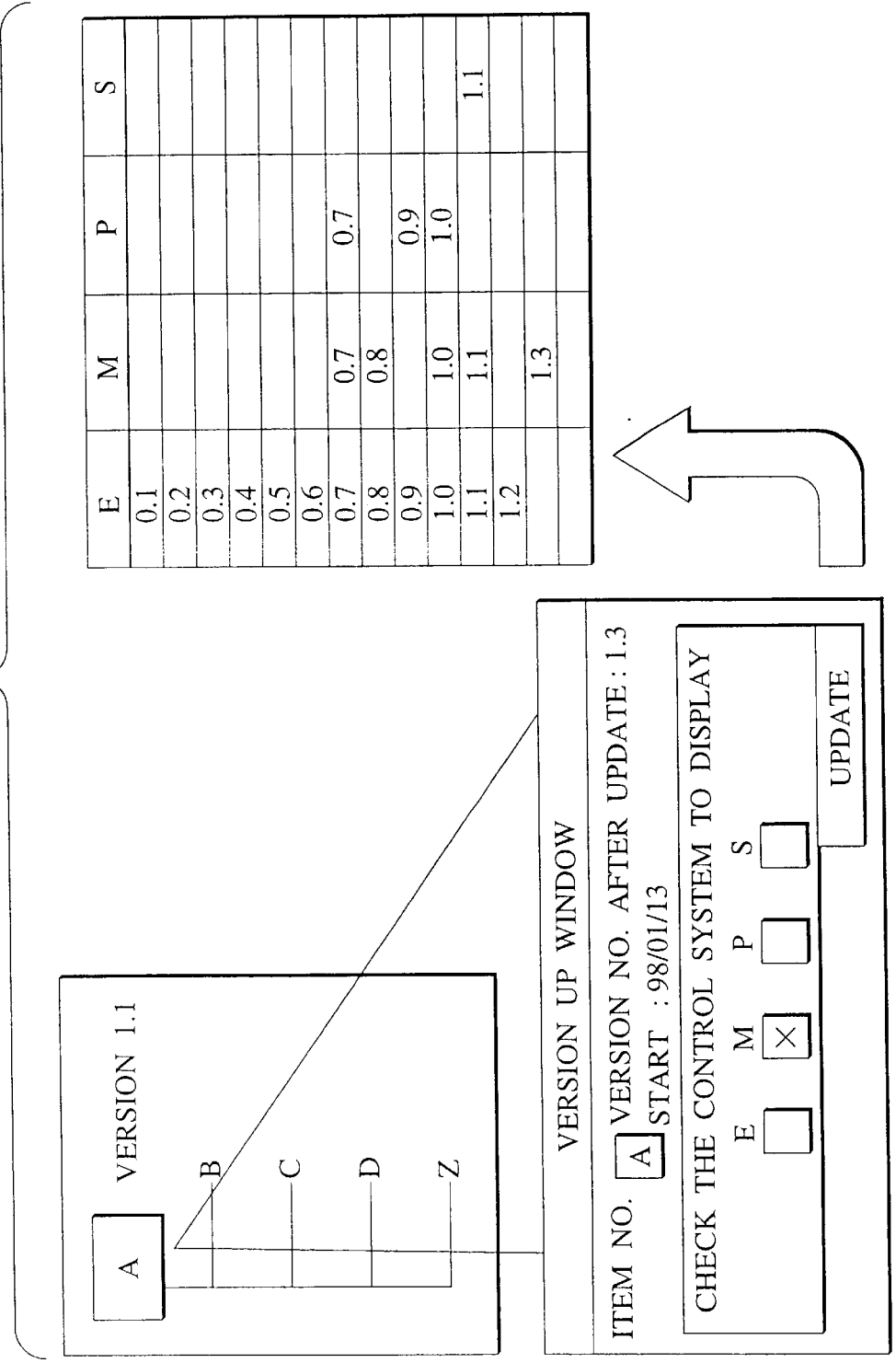
FIG. 12 is a view useful in explaining a version control in items and parts structure registered with production database 110 in FIG. 2.

FIG. 12 is a view useful in explaining a version control in items and parts structure registered with production database 110 in FIG. 2. A product may change its structure after a point of time. In this case, the change is given a version. The term version is to specify the structure of a part or product at a point of time. Generally, engineers often specify a structure of a product by use of version, and thus, the engineers need to retrieve a product by version. The version control will be explained hereinbelow.

The left-side of FIG. 12 is a display window used when a version is registered. Suppose part A of version 1.1 is changed to A of version 1.3. In such case, the operator chooses the system displaying the structure of version 1.3. In this embodiment, the operator clicks only manufacturing control system (M) as displaying the structure of version 1.3.

The right-side of FIG. 12 is an example table chart showing displayable version at each system. The system chosen at version up display window is registered with this table chart. The chart defines whether or not each system displays a structure of a version. For example, version 0.7 is displayed at (E)ngineering information system, (M)anufacturing control system, and (P)urchase management system. By referring to the chart, each system can display only necessary version.

Figure 13:
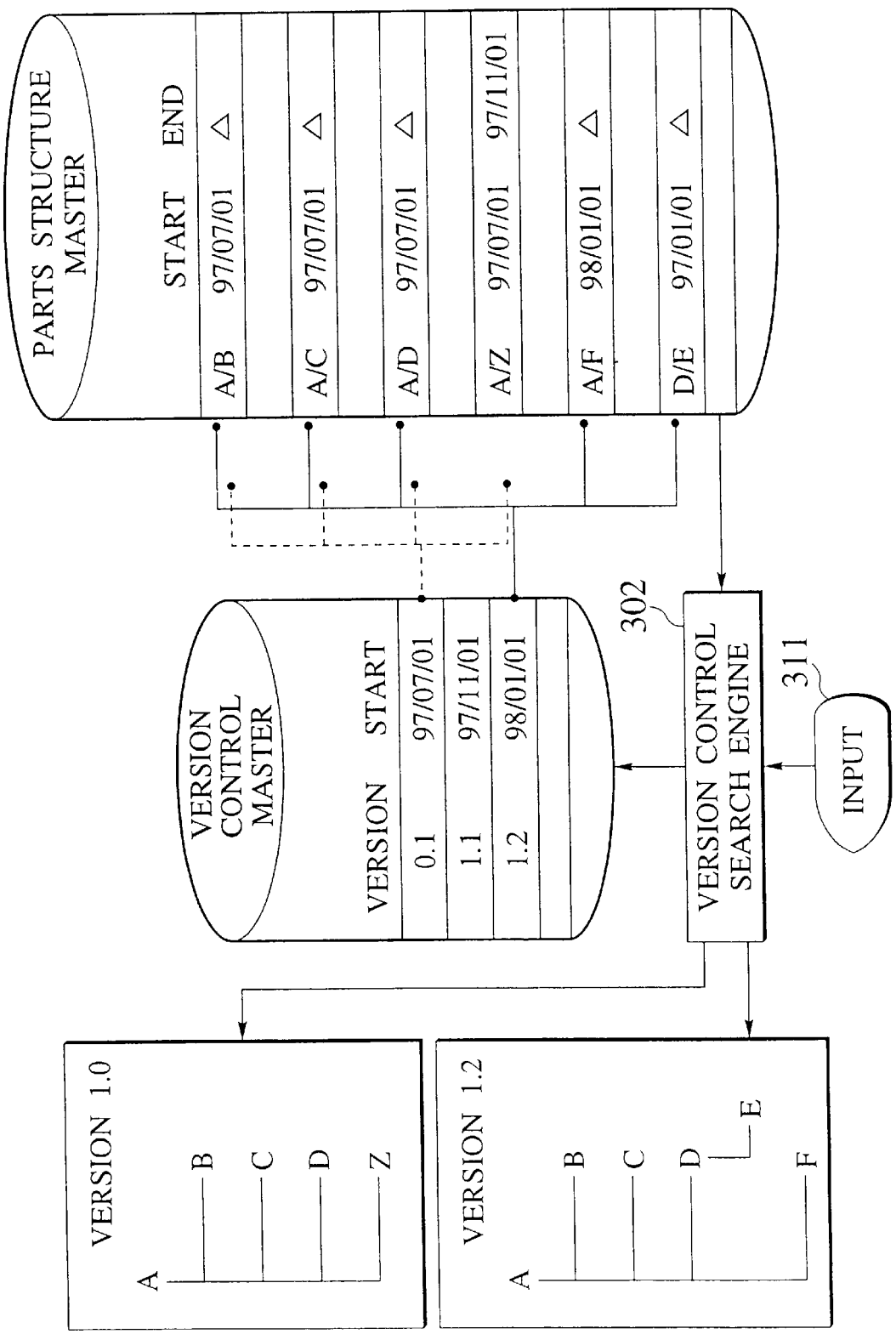
FIG. 13 is a view useful in explaining a version retrieving in items and parts structure registered with production database 110 in FIG. 2.

FIG. 13 is a view useful in explaining a version retrieving in items and parts structure registered with production database 110 in FIG. 2. The operator inputs the version to confirm the structure using input device 311. Next, the version control search engine 301 receives the version, retrieves start date from version control master and outputs the structure of the version of the product based on release information of parts structure master.

Suppose an operator inputs a version "1.0". The version control search engine 302 refers to version control master to obtain start date of the version 1.0. Then, It is known from the result that version 1.0 started Jul. 1, 1997. Next, the engine 302 retrieves the part information which the start date of the version meets the period from "START date" to "END date" of release information of parts structure master in FIG. 13. The engine 302 makes hierarchical structure based on the parts structure master, and displays the structure.

Figure 14:
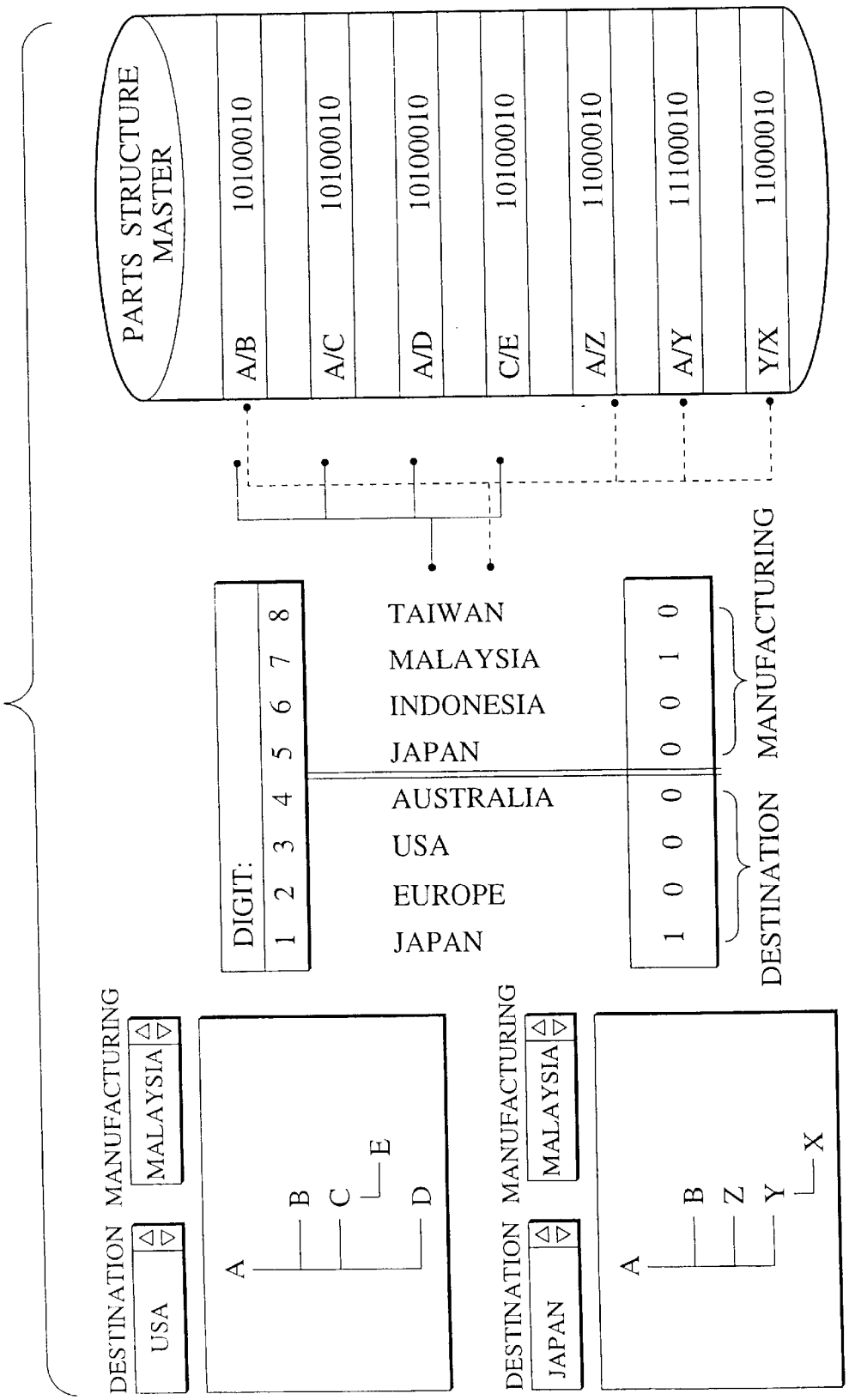
FIG. 14 is a view useful in explaining an extraction using complex conditions.

FIG. 14 is a view useful in explaining the extraction using complex conditions of complex conditions search engine. In this embodiment, as an example of the extraction using complex conditions, the destination and the manufacturing will be explained hereinbelow. For the extraction using complex conditions to be realized, a "condition" field is prepared as condition information in the parts structure master. In this embodiment, the condition field has 8 bits, and each bit is assigned the destination (1 to 4) or the manufacturing (5 to 8). Suppose the first digit is assigned Japan, second digit is assigned Europe, third digit is assigned USA, and fourth digit is assigned Australia as the destinations. On the other hand, suppose, fifth digit is assigned Japan, sixth digit is assigned Indonesia, seventh digit is assigned Malaysia, and eighth digit is assigned Taiwan as the manufacturing. In such case, a part which was manufactured in Malaysia and its destination is Japan is assigned to "10000010" in the condition field.

The left-side of FIG. 14 is an example of windows. In first case, suppose the operator chooses USA as the destination and Malaysia as the manufacturing. In this case, the system retrieves the part of the condition in which the third digit and the seventh digit are at least equal to "1", and displays the retrieve result in a hierarchical structure. Here, the retrieve is similar to the LIKE operator of SQL (Structured Query Language) with masking. In second case, suppose the operator chooses Japan as the destination and Malaysia as the manufacturing. In this case, the system retrieves the part of the condition in which the first digit and the seventh digit are at least equal to "1", and displays the retrieved result in a hierarchical structure. In this way, retrieve can be realized even if a number of conditions exist.

Figure 15:
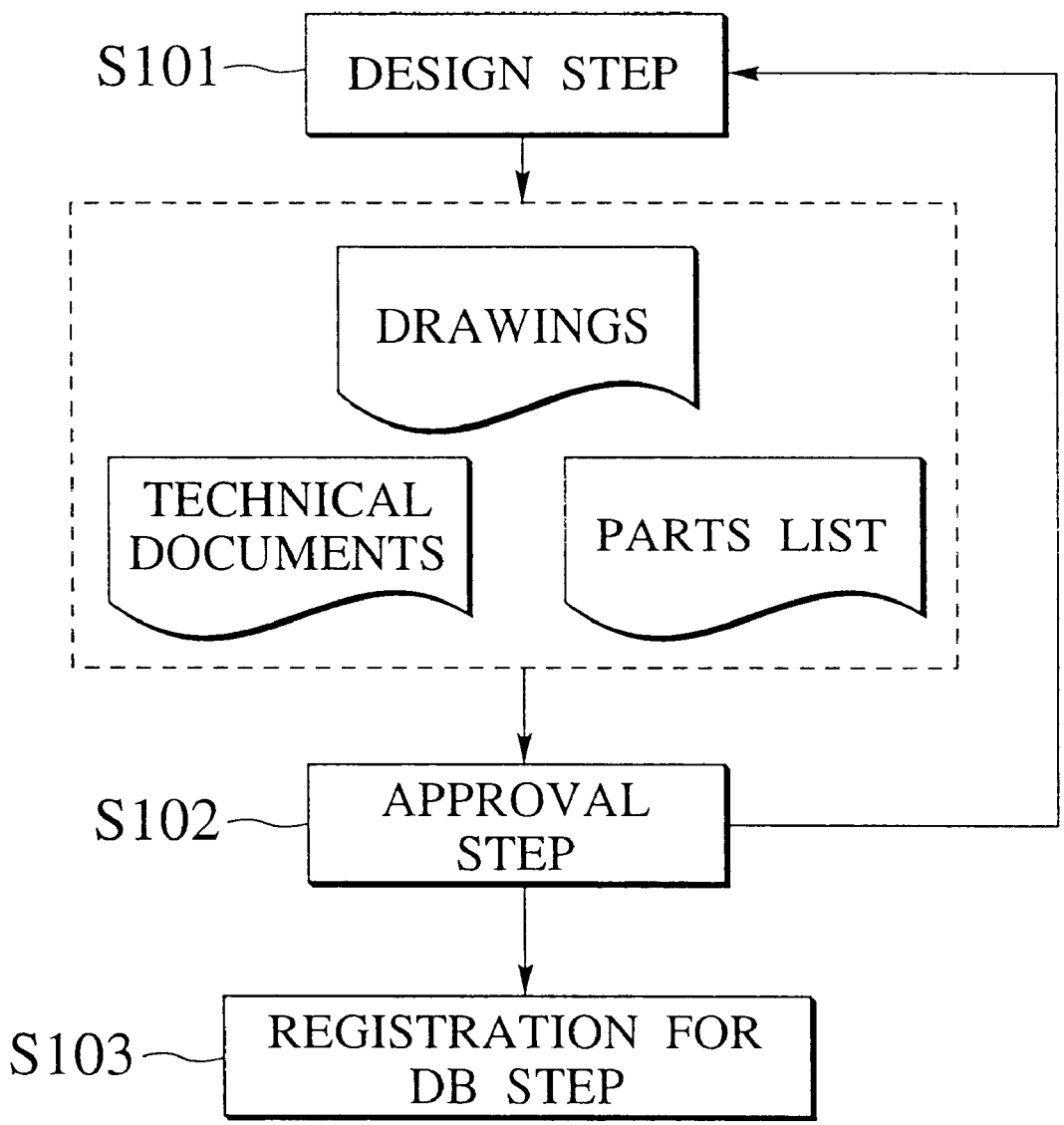
FIG. 15 is a flow chart showing workflow as a function of engineering information application in FIG. 2.

FIG. 15 is a flow chart showing workflow as a function of engineering information application in FIG. 2. First, engineers design a product or a part (step S101). Consequently, drawings, technical documents, and parts list are prepared. Next, each engineer requests for the approval. The request can be employed via electronic mail system. By use of electronic mail, the engineer can request in real time, and approvals are realized by sending the electronic mail either in parallel to several approvers at the same time or sequentially from one approver to another approver. Next, an approver examines the drawings and the like of the request and determines whether an approval has been obtained or not (step S102). If a plurality of approvals are required, the engineer may request at the same time, also may request sequentially. Here, in case of non-approval, engineers redesign a product or a part (step S101). On the other hand, in case of approval, the drawings and the like are registered with database (step 103).

In this fashion, the embodiment of a production and inventory control system described above can track the information changes, and comply with demands quickly.

A program that realizes the controlling production and inventory as described above may be stored on a recording medium. The program stored in the recording medium is read into a computer system, so that the above-described process flow producing can be realized by executing the program while controlling the computer. The recording medium includes such devices as a memory device, magnetic disk device, and an optical disk device, that are able to record the program. For example, the recording medium could be CD-ROM, DVD, ZIP, JAZ, MO, DAT, or the like.

Figure 16:
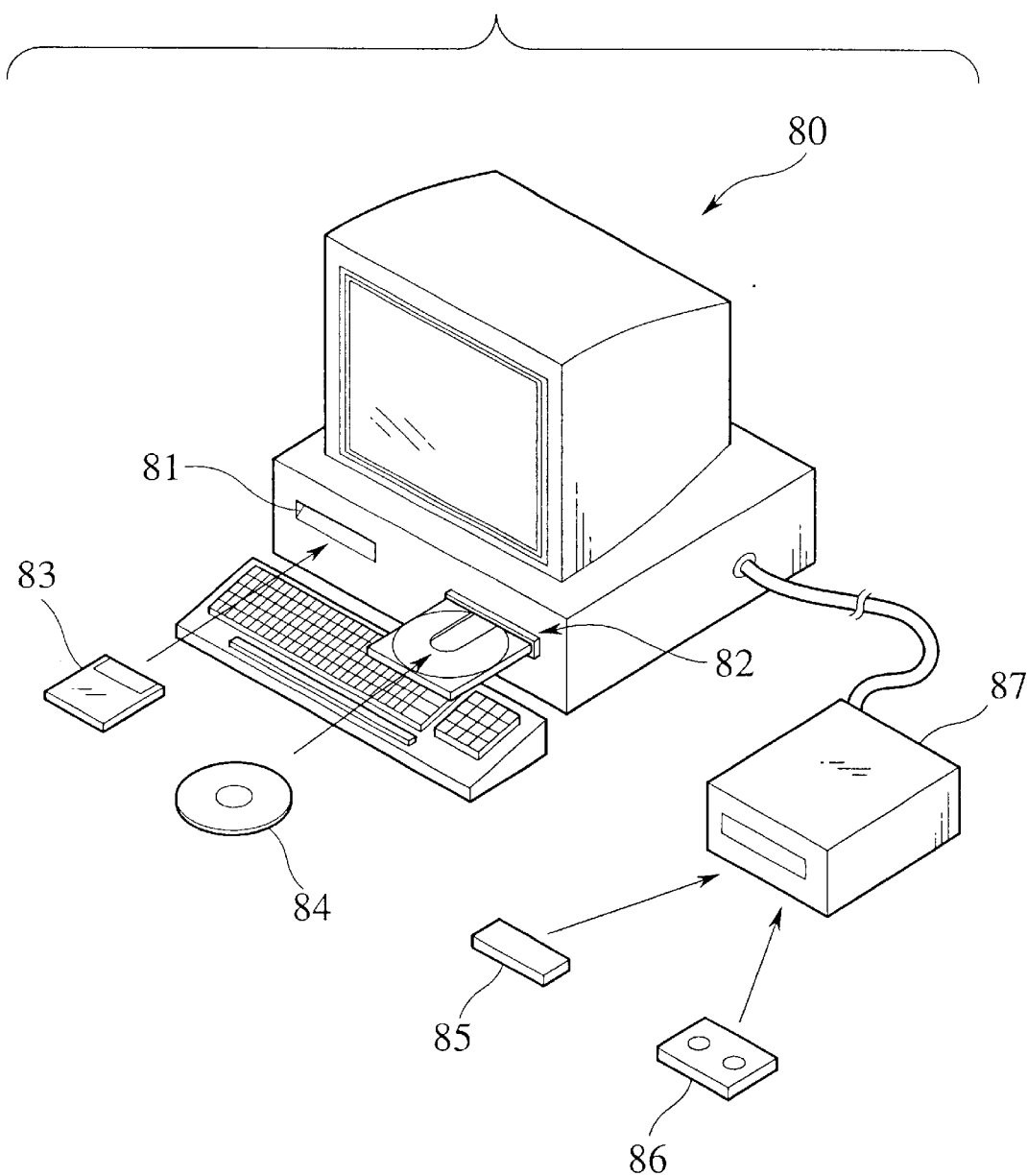
FIG. 16 shows an example of computer system that reads a computer program product.

FIG. 16 schematically shows one example of a computer system that reads a program stored in the recording medium, and performs production scheduling management according to the procedure described in the program. The computer system 80 is provided, at a front face of its main body, with a floppy disk drive 81, and CD-ROM or DVD drive 82. A drive device 87 is connected to a computer system 80. The drive device permits reading and writing of a recording medium, such as ZIP, JAZ, MO or DAT. A floppy disk 83 as a magnetic disk device, or CD-ROM or DVD 84 as an optical disk device, is inserted into each drive through a slot, and a certain reading operation is performed, so that the program stored in the recording medium can be installed in the computer system. Similarly, each type of medium 85, 86 may be inserted into a slot of a drive device 87, and a certain reading operation may be performed. In this manner, the controlling production and inventory can be performed by the computer system.

The entire content of Japanese foreign application Heisei 10 tokugan 099570 is hereby incorporate by reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A production and inventory control system, comprising:
   a production database including:
      a parts master for storing:
         name of items including products and/or parts; and
         first display information to determine whether or not the items are displayed in a first business application system; and
         second display information to determine whether or not the items are displayed in a second business application system;
      a parts structure master related to the parts master, the parts structure master storing structure information of the items; and
      a technical information list master related to the parts master, the technical information list master storing a drawing and/or technical information of the items stored in the parts master;
   said first business application system for executing a first business application, the first business application displaying the items according to the first display information in connection with the first business application system, the first business application displaying the structure of the displayed items; and
   said second business application system for executing a second business application that is different from the first business application, the second business application displaying the items according to the second display information in connection with the second business application system, the second business application displaying the technical information of the displayed items,
   wherein at least a portion of the display information displayed by each business application is unique to that particular business application.

2. The system according to claim 1, wherein the parts master further stores attribute display information to determine whether or not the drawing or the technical information is displayed in each business application system, and wherein the second business application system displays the drawing or the technical information according to the attribute display information.

3. The system according to claim 1, wherein the parts structure master stores hierarchical information of the products and/or the parts.

4. The system according to claim 2, wherein the first business application system provides items based on the display information, and provides drawings or technical information lists corresponding to products and/or parts based on the attribute display information.

5. The system according to claim 1, wherein the parts master further comprises release information including the start date of an item, and the end date of an item, the production database further comprises a version control master for storing version information which specify the structure of a part or product at a point in time.

6. The system according to claim 5, wherein the first business application has a version control search engine which outputs the structure of the product or part at a point of date or time based on the version information of parts master.

7. The system according to claim 1, wherein the parts master further comprises condition information for extraction using complex conditions.

8. The system according to claim 7, wherein the first business application has a complex conditions search engine which outputs the structure of the product or part meeting the complex conditions.

9. The system according to claim 1, wherein the parts master further comprises a release information including a start date and end date of the items to determine a release period of the items, and wherein the first business application displays the structure of the displayed items at a point of date based on the release information.

10. The system according to claim 9, wherein the first business application system has a generation control search engine which outputs the structure of the product or part at a point of date or time based on the release information of the parts master.

11. A computer program product for controlling production and inventory, comprising:
   a production database including:
      a parts master for storing:

name of items including products and/or parts; and
first display information to determine whether or not the items are displayed in a first business application system; and
second display information to determine whether or not the items are displayed in a second business application system;
a parts structure master related to the parts master, the parts structure master storing structure information of the items; and
a technical information list master related to the parts master, the technical information list master storing a drawing and/or technical information of the items stored in the parts master;
said first business application system for executing a first business application, the first business application displaying the items according to the first display information in connection with the first business application system, the first business application displaying the structure of the displayed items; and
said second business application system for executing a second business application that is different from the first business application, the second business application displaying the items according to the second display information in connection with the second business application system, the second business application displaying the technical information of the displayed items,
wherein at least a portion of the display information displayed by each business application is unique to that particular business application.

12. The program product according to claim 11, wherein the parts master further stores attribute display information to determine whether or not the drawing or the technical information is displayed in each business application system, and wherein the second business application system displays the drawing or the technical information according to the attribute display information.

13. The program product according to claim 11, wherein the parts structure master stores hierarchical information of the products and/or the parts.

14. The program product according to claim 12, wherein the first business application program provides items based on the display information, and provides drawings or technical information list corresponding to products and/or parts based on the attribute display information.

15. The program product according to claim 11, wherein the parts master further comprises release information including the start date of an item, and the end date of an item, the production database further comprises a version control master for storing version information which specify the structure of a part or product at a point in time.

16. The program product according to claim 15, wherein the first business application system has a generation control search engine which outputs the structure of the product or part at a point of date or time based on the release information of the parts master.

17. The program product according to claim 15, wherein the first business application has a version control search engine which outputs the structure of the product or part at a point of date or time based on the version information of parts master.

18. The program product according to claim 12, wherein the parts master further comprises condition information for extraction using complex conditions.

19. The program product according to claim 18, wherein the first business application has a complex conditions search engine which outputs the structure of the product or part meeting the complex conditions.

20. The computer program product according to claim 11, wherein the parts master further comprises release information including a start date of the items to determine a release period of the items, and wherein the first business application displays the structure of the displayed items at a point of date based on the release information.

21. A method of controlling production and inventory, comprising the steps of:
providing a database for storing data including:
product names;
configuration data for each product; and
first display information for each product indicating what data is viewed by a purchasing division;
second display information for each product indicating what data is viewed by a manufacturing division; and
third display information for each product indicating what data is viewed by an engineering division;
displaying purchasing data on a purchasing division business application, said purchasing division business application displaying only what data is indicated for said purchasing division by said first display information;
displaying manufacturing data on a manufacturing division business application, said manufacturing division business application displaying only what data is indicated for said manufacturing division by said second display information; and
displaying engineering data on an engineering division business application, said engineering division business application displaying only what data is indicated for said engineering division by said third display information,
wherein said purchasing division business application, said manufacturing division business application, and said engineering division business application are different business applications
wherein at least a portion of the data displayed by each business application is unique to that particular business application.

22. The method of claim 21, wherein said stored data further includes start and end dates for automatically altering what data is displayed by said displaying steps.

23. The method of claim 21, wherein at least one common data is displayed by at least two of said displaying steps.

* * * * *